(12) United States Patent
Shimura et al.

(10) Patent No.: US 6,712,492 B2
(45) Date of Patent: Mar. 30, 2004

(54) SPREAD ILLUMINATING APPARATUS WITH LIGHT REFLECTION-DIFFUSION LAYER ON OPTICAL PATH CONVERSION MEANS

(75) Inventors: Takahiro Shimura, Iwata-gun (JP); Yoshiki Nakamura, Iwata-gun (JP); Koichi Toyoda, Iwata-gun (JP)

(73) Assignee: Minebea Co., Ltd., Kitasaku-gun (JP)

( * ) Notice: Subject to any disclaimer, the term of this patent is extended or adjusted under 35 U.S.C. 154(b) by 0 days.

(21) Appl. No.: 10/102,870

(22) Filed: Mar. 22, 2002

(65) Prior Publication Data

US 2002/0141201 A1 Oct. 3, 2002

(30) Foreign Application Priority Data

Mar. 30, 2001 (JP) ........................................ 2001-100733

(51) Int. Cl.[7] ................................................. F21V 8/00
(52) U.S. Cl. .......................... 362/558; 362/551; 362/31
(58) Field of Search ........................... 362/31, 551, 558, 362/26, 560, 27; 385/50, 901

(56) References Cited

U.S. PATENT DOCUMENTS 6,168,281 B1 * 1/2001 Suzuki .......................... 362/31
6,295,104 B1 * 9/2001 Egawa et al. .................. 362/26

FOREIGN PATENT DOCUMENTS

JP    A 2000-11723    1/2000
JP    A 2000-231814   8/2000

* cited by examiner

Primary Examiner—Sandra O'Shea
Assistant Examiner—Bao Q. Truong
(74) Attorney, Agent, or Firm—Oliff & Berridge PLC

(57) ABSTRACT

The present invention provides a spread illuminating apparatus which can ensure uniform brightness over its entire screen. A light reflection-diffusion layer is formed on a light conductive member at a face provided with an optical path conversion means. Light emitted from spot-like light sources is reflected efficiently by the light reflection-diffusion layer toward a transparent substrate, and light intensity degrades in a substantially linear manner with the increase in distance from respective spot-like light sources. Sharp change of brightness on an observation surface can be prevented due to the light intensity degrading linearly.

15 Claims, 8 Drawing Sheets

SPREAD ILLUMINATING APPARATUS WITH LIGHT REFLECTION-DIFFUSION LAYER ON OPTICAL PATH CONVERSION MEANS

BACKGROUND OF THE INVENTION

1. Field of the Invention

The present invention relates to a spread illuminating apparatus used as an illuminating means for signboards, various kinds of reflection-type display devices and the like, and more particularly for a liquid crystal display.

2. Description of the Related Art

A liquid crystal display as a display for many electric products such as cellular phones and personal computers has been increasingly demanded due to its low profile, small occupied volume, and light weight. Since the liquid crystal display uses a liquid crystal, which does not emit light by itself, an illuminating apparatus is required when used in dark places where sufficient sunlight or room illumination is unavailable. Thus, the illuminating apparatus to illuminate the liquid crystal is desired to be compact and small in power consumption, and at the same time, high image quality is desired on the observation surface. Accordingly, there has been a growing tendency to employ a thin plate-like spread illuminating apparatus of side light type (light conductive plate type) as an illuminating means for the liquid crystal display.

FIG. 12 shows an example of a conventional side light type spread illuminating apparatus. This spread illuminating apparatus has been devised to realize a uniform spread light emission (Japanese Patent Laid-open No. 2000–11723), and the detail thereof is described below.

A spread illuminating apparatus 1' is disposed so as to cover an upper face of a reflection-type liquid crystal element L, and is generally composed of a plate-like transparent substrate 2 shaped rectangular in section and made of a light-transmissible material, a light source 4 disposed close to one end face 3 of the transparent substrate 2, and a light reflection member (reflector) 12 to cover the light source 4 and a portion of the transparent substrate 2 near the one end face 3.

The light source 4 is composed of a bar-like light conductive member 7, and spot-like light sources 9 and 9' such as light-emitting diodes disposed on both ends 8 of the light conductive member 7. An optical path conversion means 11 is formed on one face 14 of the light conductive member 7 opposite to a face 13 facing the end face 3 of the transparent substrate 2, and is composed of grooves 15 as light scattering portions shaped, for example, triangular in section, and flat portions 16 adjacent to the grooves 15. The interval of the grooves 15 is set to gradually decrease with the increase in distance from the spot-like light sources 9 and 9'. Thus, the optical path conversion means 11 is formed in consideration of a balance between the distance from respective spot-like light sources 9 and 9' and the interval of the grooves 15, whereby light is uniformly emitted through the face 13 of the light conductive member 7 despite the spot-like light sources 9 and 9' being disposed on the ends 8 of the light conductive member 7. The optical path conversion means 11 is not limited to the above configuration but may comprise grooves without flat portions or comprise light scattering portions with a finely roughened surface and plain portions with a smooth surface.

A light reflection pattern 17 is formed on an upper face 6 of the transparent substrate 2 in parallel to the end face 3.

The light reflection pattern 17 is composed of a large number of grooves 18 substantially triangular in section and flat portions 19 adjacent to the grooves 18, and the interval between adjacent grooves 18 is varied from position to position so as to make the illumination uniformly spread everywhere on the transparent substrate 2 irrespective of the distance from the light source 4. Specifically, the ratio of the width (occupied area) of the grooves 18 to the width (occupied area) of the flat portions 19 is set to gradually increase in proportion to the increase in distance from the end face 3 of the transparent substrate 2.

Further, a light reflection member 12 is disposed so as to cover the longitudinal faces of the light conductive member 7 except the face 13 and the end of the transparent substrate 2 close to the light conductive member 7, whereby light emitted from the spot-like light sources 9 and 9' into the light conductive member 7 is efficiently guided into the transparent substrate 2. The light reflection member 12 is made of a hard resin product substantially U-shaped in section, and having a metal (such as silver) vapor deposited film, a white film, etc. stuck on its inner surface, or made of a U-shape bent metal sheet such as an aluminum sheet and a stainless steel sheet, and disposed so as to cover the light conductive member 7.

However, the above spread illuminating apparatus has a disadvantage that dark and bright fringes orthogonal to the end face 3 appear on the screen. The dark and bright fringes are attributable to the optical path conversion means 11 formed on the light conductive member 7, which means that while light reflected at the grooves 15 of the optical path conversion means 11 is mostly emitted through the face 13 to be guided into the transparent substrate 2, light reflected at the flat portions 16 mostly undergoes total reflection and is not emitted through the face 13, and thus, the light is emitted through the face 13 with uneven brightness according to the pattern of grooves 15 and the flat portions 16. Since the brightness of light guided into the transparent substrate 2 is uneven, dark and bright fringes orthogonal to the end face 3 are generated on the screen. This problem can be solved if the pattern of the grooves 15 and the flat portions 16 is finely structured but it is difficult to ensure a machining accuracy required to realize such a fine structure.

So, it was proposed that a light diffusion plate 20 be disposed between the light conductive member 7 and the transparent substrate 2 as illustrated in FIG. 13 so as to uniform the brightness of light incident on the transparent substrate 2. The light diffusion plate 20 is structured such that a light diffusion portion containing a light diffusion substance is formed on a thin plate, and diffuses light emitted through the face 13 of the light conductive member 7 to substantially uniform the brightness of light incident on the end face 3 of the transparent substrate 2 (Japanese Patent Laid-open No. 2000–231814).

A spread illuminating apparatus 1" shown in FIG. 13 is effective in uniforming the brightness of light on an observation surface but has a disadvantage that the transmittance of the light diffusion plate 20 is low, which degrades the ratio of utilization of light from the light source 4 resulting in an increased power consumption to obtain a required brightness on the screen.

However, without the light diffusion plate, the spread illuminating apparatus still suffers the problem that the dark and bright fringes cannot be fully eliminated on the screen even when the optical path conversion means is structured finely with highest machining accuracy.

SUMMARY OF THE INVENTION

The present invention has been made in view of the above, and an object of the present invention is therefore to provide a spread illuminating apparatus which can ensure uniform and high brightness entirely over the screen without increasing power consumption.

In order to solve the above problems, according to a first aspect of the present invention, there is provided a Spread illuminating apparatus which comprises a transparent substrate made of a light-transmissible material and a light source composed of a bar-like light conductive member and at least one spot-like light source disposed on an end of the light conductive member, disposed along and close to an end face of the transparent substrate, and having an optical path conversion means which comprises a large number of light scattering portions, such as grooves, with or without flat portions therebetween, and is provided on at least one face of the light conductive member, wherein a light reflection-diffusion layer is formed on the at least one face of the bar-like light conductive member.

In accordance with the present invention, the reflectance at the grooves is improved by forming the light reflection-diffusion layer on the face, whereby while light emitted from the spot-like light source is reflected toward the transparent substrate in an increased amount at positions closer to the spot-like light source, the intensity of light reflected toward the transparent substrate decreases substantially linearly as the increase in distance from the spot-like light source irrespective of the distance from the spot-like light source, and sudden and sharp change of brightness can be eliminated.

In order to solve the above problems, according to a second aspect of the present invention, in the spread illuminating apparatus of the first aspect, the light reflection-diffusion layer is a white coating, whereby the light reflectance can be improved, at the same time the intensity of light incident on the transparent substrate is adapted to degrade in a substantially linear manner with the increase in distance from the spot-like light source, and thus sharp change of brightness on the screen can be eliminated. Further, the uniformity in color on the observation surface can be improved.

In order to solve the above problems, according to a third aspect of the present invention, in the spread illuminating apparatus of the first aspect, the light reflection-diffusion layer is a light diffusible mat coating, whereby the light reflectance can be improved, at the same time the intensity of light incident on the transparent substrate is adapted to degrade in a substantially linear manner with the increase in distance from the spot-like light source, and thus sharp change of brightness on the screen can be eliminated.

In order to solve the above problems, according to a fourth aspect of the present invention, in the spread illuminating apparatus of the third aspect, the light diffusible mat coating is of a frosted mat. Further, according to a fifth aspect of the present invention, in the spread illuminating apparatus of the third aspect, the light diffusible mat coating is of silica.

In order to solve the above problems, according to a sixth aspect of the present invention, in the spread illuminating apparatus of any one of the first to third aspects, the light reflection-diffusion layer is formed entirely on the face provided with the optical path conversion means, whereby the light reflectance can be improved.

In order to solve the above problems, according to a seventh aspect of the present invention, in the spread illuminating apparatus of any one of the first to third aspects, the light reflection-diffusion layer is formed partly at predetermined portions of the face provided with the optical path conversion means, whereby sharp change of brightness is eliminated. Here, the predetermined portions are portions corresponding to dark portions of the uneven brightness conventionally generated on the screen.

In order to solve the above problems, according to an eighth aspect of the present invention, in the spread illuminating apparatus of the fourth or fifth aspect, the light diffusible mat coating is formed entirely on the face provided with the optical path conversion means.

In order to solve the above problems, according to a ninth aspect of the present invention, in the spread illuminating apparatus of the fourth or fifth aspect, the light diffusible mat coating is formed partly at a predetermined portions of the face provided with the optical path conversion means.

DESCRIPTION OF THE PREFERRED EMBODIMENTS

Figure 1:
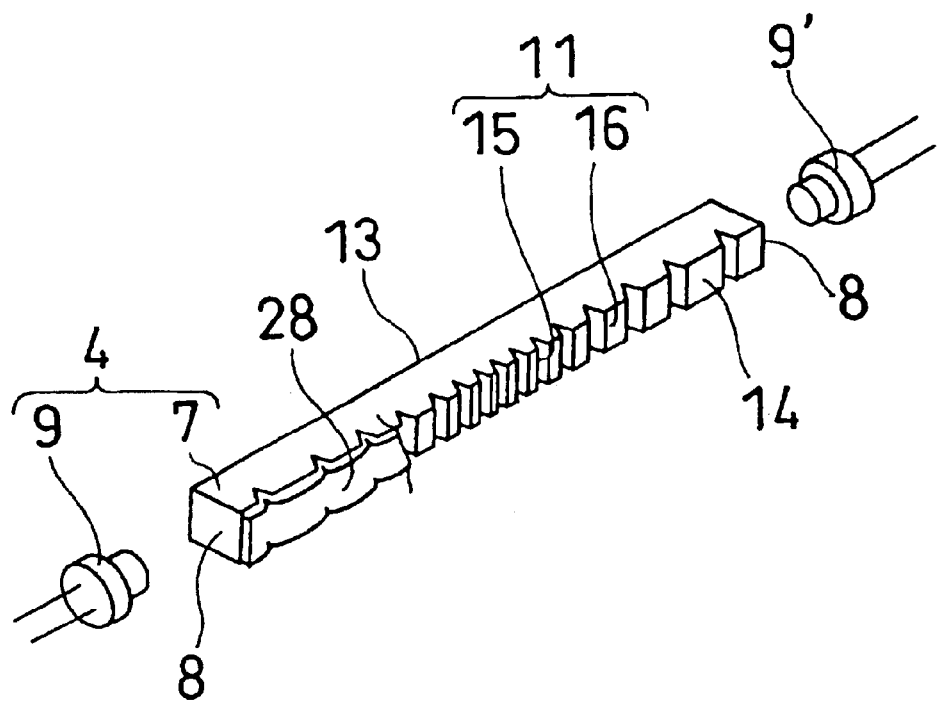
FIG. 1 is a perspective view showing an embodiment of a light source of a spread illuminating apparatus in accordance with the present invention.

A spread illuminating apparatus according to an embodiment of the present invention will be described with reference to attached drawings. Note that, in the spread illuminating apparatus of the present invention, a light source of a spread illuminating apparatus explained as a conventional example is improved. The parts and components identical with or equivalent to those of the conventional spread illuminating apparatus are indicated by the same reference numerals and a detailed description thereof is omitted.

Figure 13:
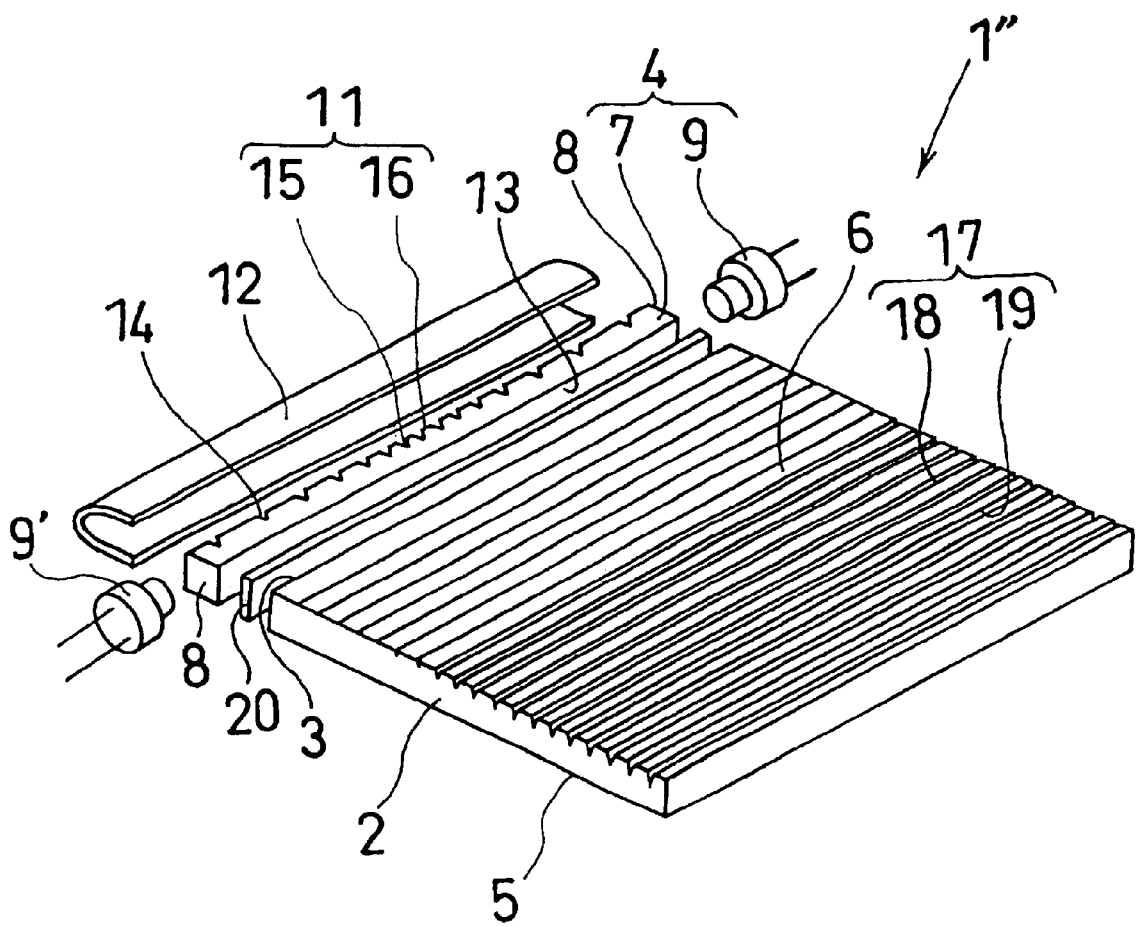
FIG. 13 is an exploded perspective view showing another embodiment of a conventional spread illuminating apparatus.

In FIG. 1, a light source 4 is composed of a bar-like light conductive member 7 and spot-like light sources 9 and 9' disposed facing both ends 8 of the light conductive member 7, respectively. An optical path conversion means 11 is provided on a face 14 of the light conductive member 7 opposite to a face 13 facing an end face 3 of a transparent substrate 2 (refer to FIG. 13). The optical path conversion means 11 is composed of a plurality of grooves 15 substantially triangular in section and flat portions 16 adjacent to the grooves 15. A light reflection-diffusion layer 28 is formed by coating so as to cover the face 14 provided with the optical path conversion means 11.

The interval between adjacent grooves 15 gradually decreases with the increase in distance from the spot-like light sources 9 and 9', and is smallest substantially at a center of the light conductive member 7. This is to compensate the degradation in brightness due to the increase in distance from the spot-like light sources 9 and 9' by increasing the number of the grooves 15 per distance, thereby uniforming the brightness entirely over the light conductive member 7.

The light reflection-diffusion layer 28 which is a coating to efficiently reflect light is formed on the face 14 of the light conductive member 7 so as to cover the optical path conversion means 11, whereby light emitted from the spot-like light sources 9 and 9' can be efficiently reflected at the face 14 toward the transparent substrate 2. This means that light which, after reflected at the optical path conversion means 11, exits out the face 14 of the light conductive member 7 in a conventional apparatus is reflected toward the transparent substrate 2 by means of the light reflection-diffusion layer 28 formed on the optical path conversion means 11. Thus, the amount of light traveling away from the spot-like light sources 9 and 9' through the light conductive member 7 is reduced. As a result, the intensity of light emitted from the spot-like light sources 9 and 9' and reflected toward the transparent substrate 2 via the light conductive member 7 degrades in a substantially linear manner with the increase in distance from the spot-like light sources and sharp change of brightness on the observation surface can be eliminated (this will be described below as an example).

Figure 2:
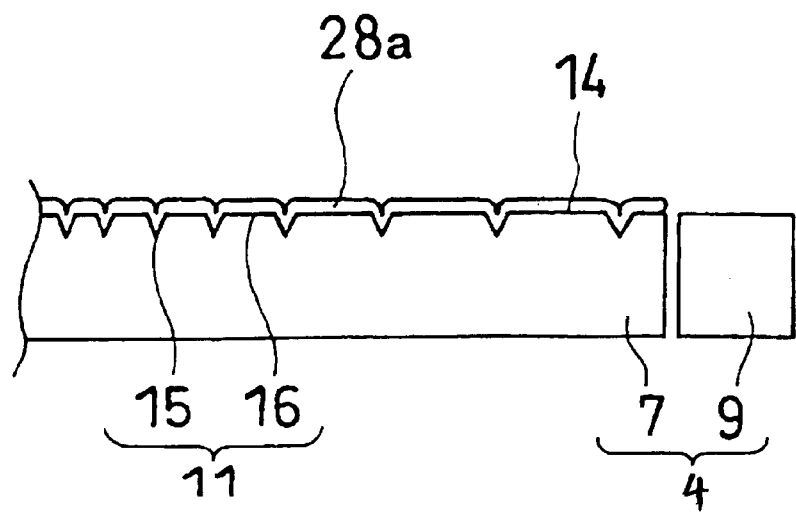
FIG. 2 shows an embodiment of a light reflection-diffusion layer formed on one face of a light conductive member shown in FIG. 1.

FIG. 2 is a top plan view of the light conductive member 7 where a white coating 28a is used as an embodiment of the light reflection-diffusion layer 28 formed on the face 14.

As illustrated in the figure, the white coating 28a is present entirely on the face 14 so as to cover all the grooves 15 and the flat portions 16.

The white coating 28a is provided by applying a white (milky white may be acceptable) coating material. With the white coating 28a, light can be reflected more efficiently at the face 14 of the light conductive member 7, and the amount of light directed toward the transparent substrate 2 increases. The coating material can be applied to the face 14 by any general coating methods, such as a screen printing, other general printings and a spray painting.

Figure 3:
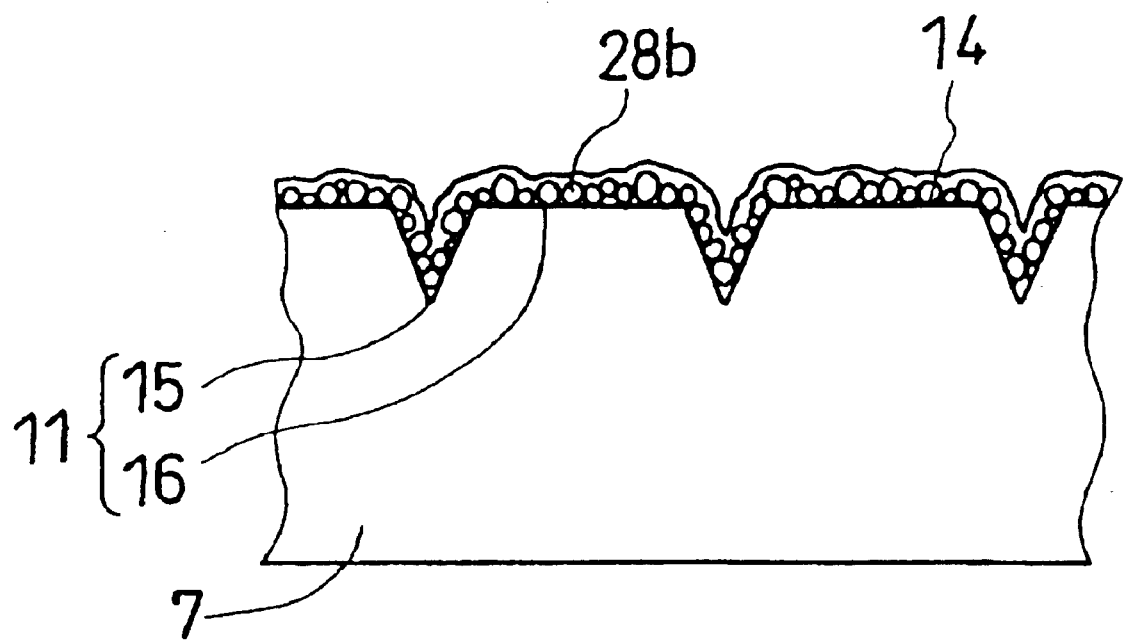
FIG. 3 shows another embodiment of the light reflection-diffusion layer shown in FIG. 1.

FIG. 3 shows a light diffusible mat coating 28b used as another embodiment of the light reflection-diffusion layer 28. At illustrated in the figure, the light diffusible mat coating 28b is present entirely on the face 14 so as to cover all the grooves 15 and the flat portions 16. A mat is defined as what is formed by applying a solution containing clear beads, and here specifically by applying a suspension with scattered clear beads each having a grain size of 4.5 µm maximum. The clear beads are made of silica or the like. In addition, a frosted mat may be used. With the light diffusible mat coating, light can be reflected more efficiently at the face 14, and the amount of light directed toward the transparent substrate 2 increases. Since part of light emitted from the spot-like light sources filters through the light diffusible mat coating 28b and exits out the light conductive member 7, the amount of proceeding light increases compared with when the white coating 28a is used.

Figure 4:
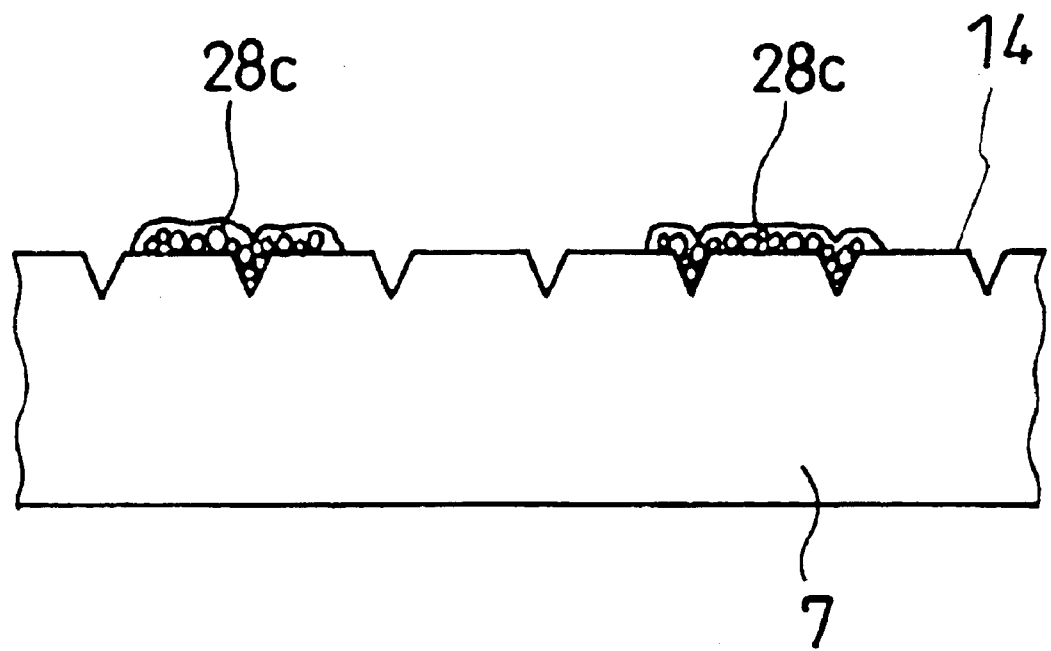
FIG. 4 shows still another embodiment of the light reflection-diffusion layer shown in FIG. 1.

In FIG. 4, the light reflection-diffusion layer 28 is partly formed on the face 14 only at predetermined portions, and two light diffusible mat coatings 28c are shown in the figure as an example. The light diffusible mat coatings 28c are present at positions of the face 14 corresponding to dark portions on the observation surface. Sharp change of brightness is eliminated and therefore the brightness can be uniformed by increasing the light reflectance at the portion provided with the light diffusible mat coatings 28c, i.e., by increasing the amount of light reflected toward the dark portions on the observation surface.

Figure 5:
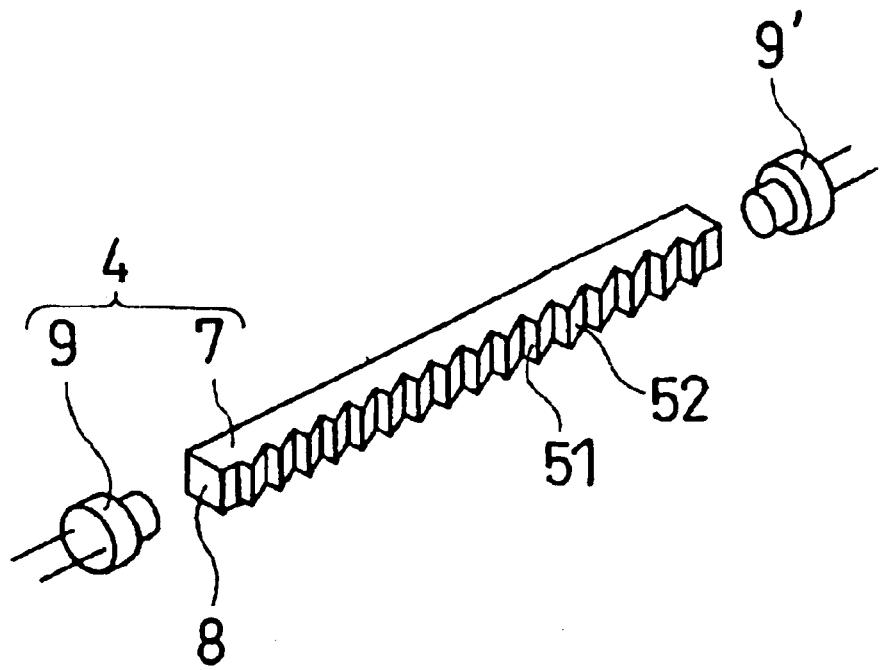
FIG. 5 is a perspective view showing another embodiment of the light source of the spread illuminating apparatus in accordance with the present invention.

The configuration of the optical path conversion means formed on the light conductive member is not limited to the embodiment shown in FIG. 1, and, for example, an embodiment shown in FIG. 5 is acceptable. In FIG. 5, grooves comprising two inclined faces 51 and 52 and shaped substantially triangular in section are continuously formed without flat portions. In such a configuration, an operating effect equal to that of the optical path conversion means explained in FIG. 1 can be obtained by gradually changing the width of the grooves according to the distance from the spot-like light sources 9 and 9'.

Further, a similar operating effect can result from an optical path conversion means comprising a plurality of grooves and flat portions adjacent to the grooves, in which the width of the grooves is gradually changed while the interval therebetween is constant.

EXAMPLE

Variation of light intensity, i.e., difference in brightness is compared between a case where the light reflection-diffusion layer 28 is formed on the face 14 of the light conductive member 7 and a case where the light reflection-diffusion layer is not formed thereon.

Figure 8:
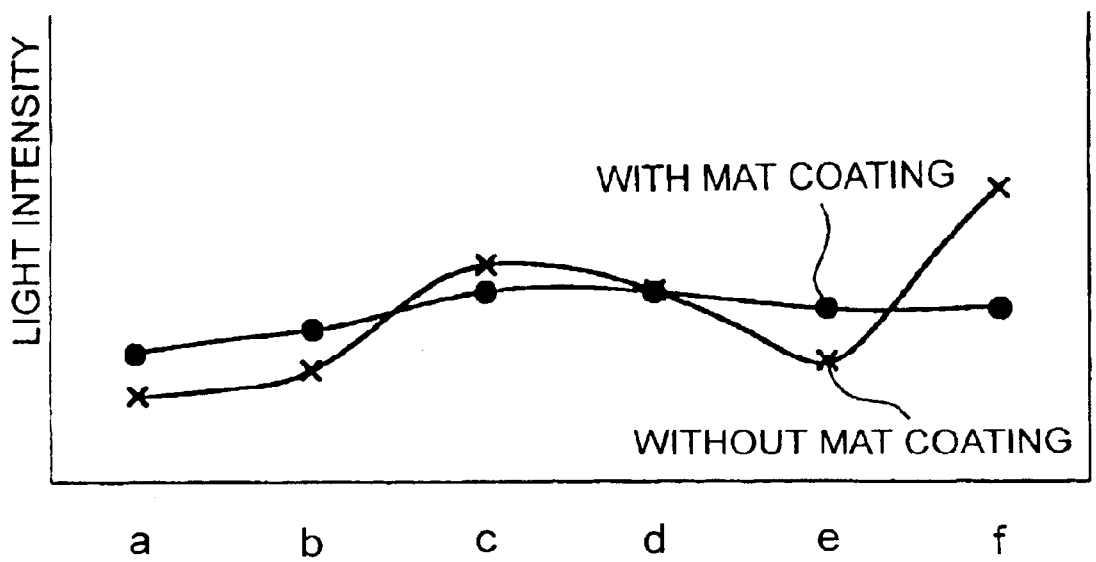
FIG. 8 is a graph showing light intensities at positions of measurement on the transparent substrate.
Figure 9:
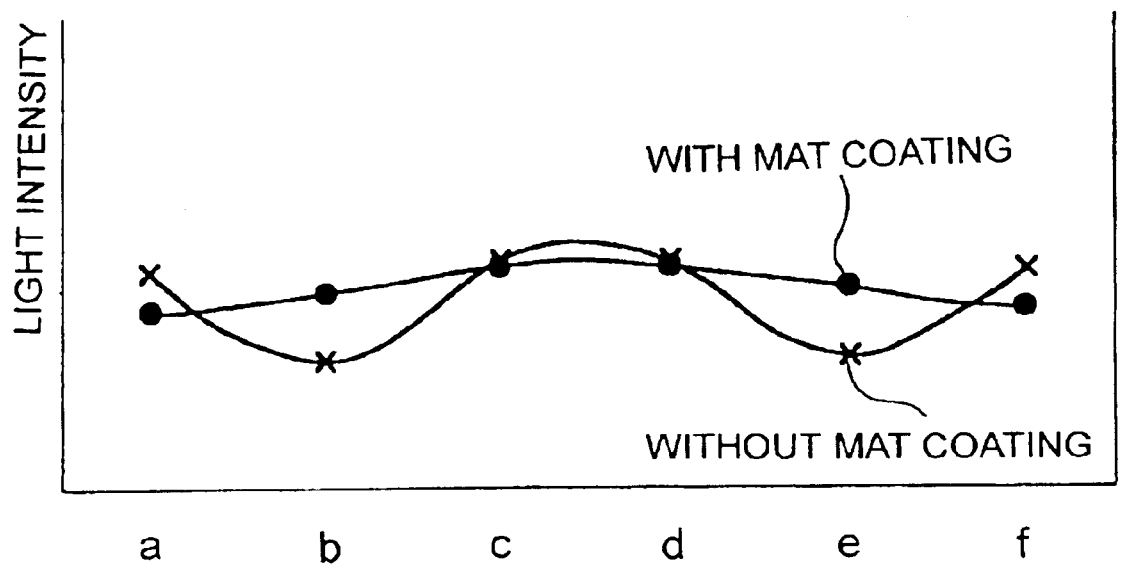
FIG. 9 is a graph showing light intensities at positions of measurement on the transparent substrate.
Figure 10:
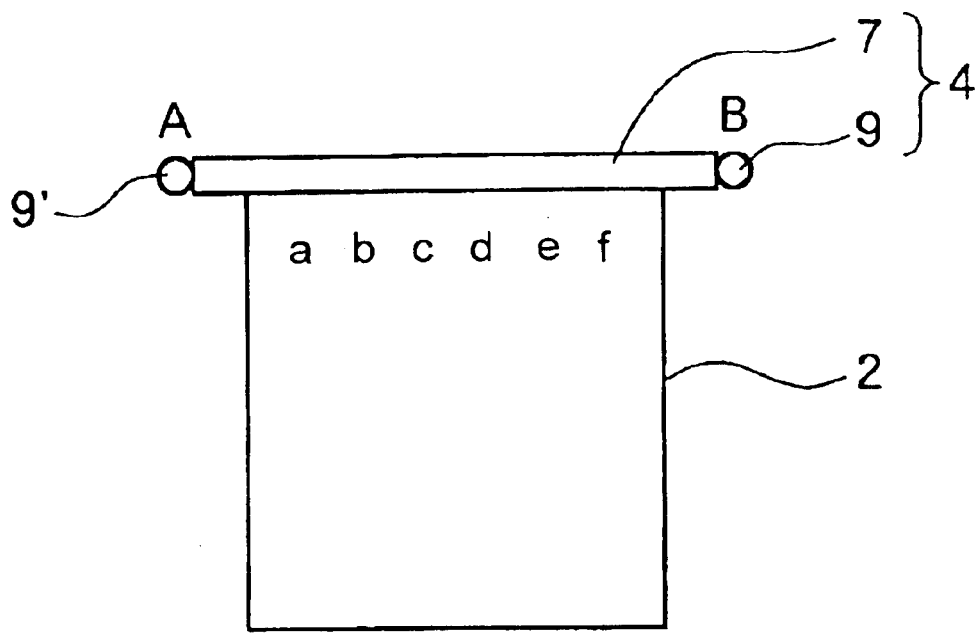
FIG. 10 shows the positions of light intensity measurement on the transparent substrate.

FIGS. 6 to 9 are graphs showing light intensities at respective measurement positions a to f on the transparent substrate 2 shown in FIG. 10.

Figure 6:
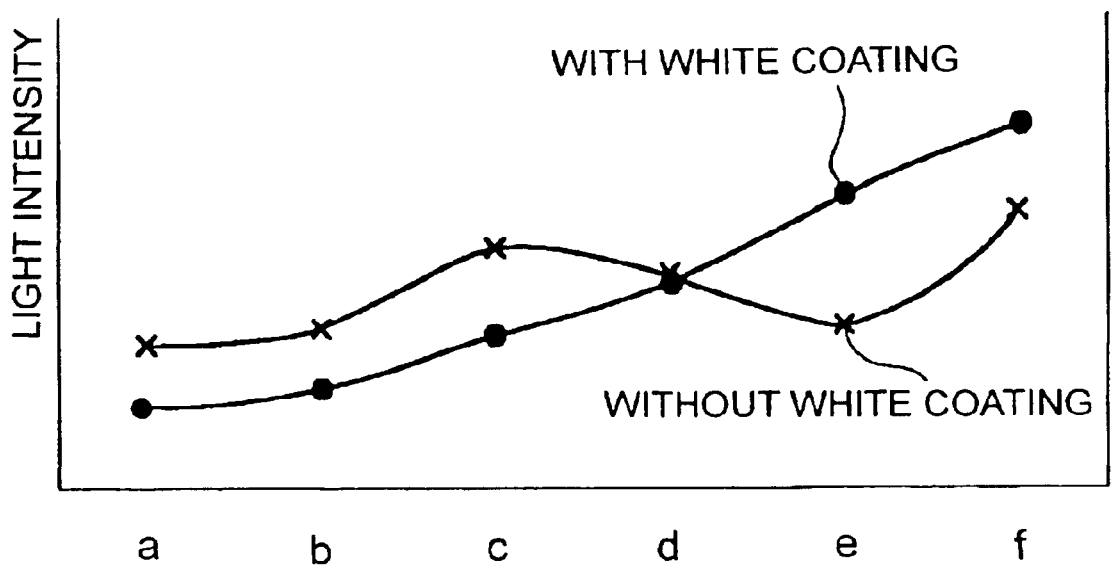
FIG. 6 is a graph showing light intensities at positions of measurement on the transparent substrate.
Figure 7:
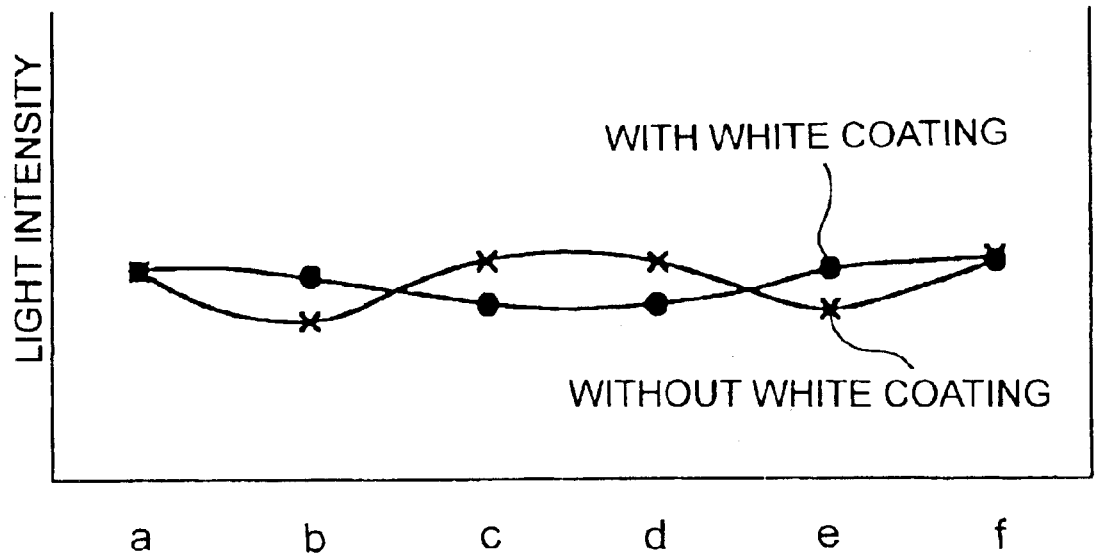
FIG. 7 is a graph showing light intensities at positions of measurement on the transparent substrate.

FIGS. 6 and 7 show measurement results when the white coating 28a is present as the light reflection-diffusion layer 28, with FIG. 6 showing results when one spot-like light source 9(B) is disposed on an end of the light conductive member 7 and FIG. 7 showing results when two spot-like light sources 9'(A) and 9(B) are disposed on both ends of the light conductive member 7, respectively.

Figure 11:
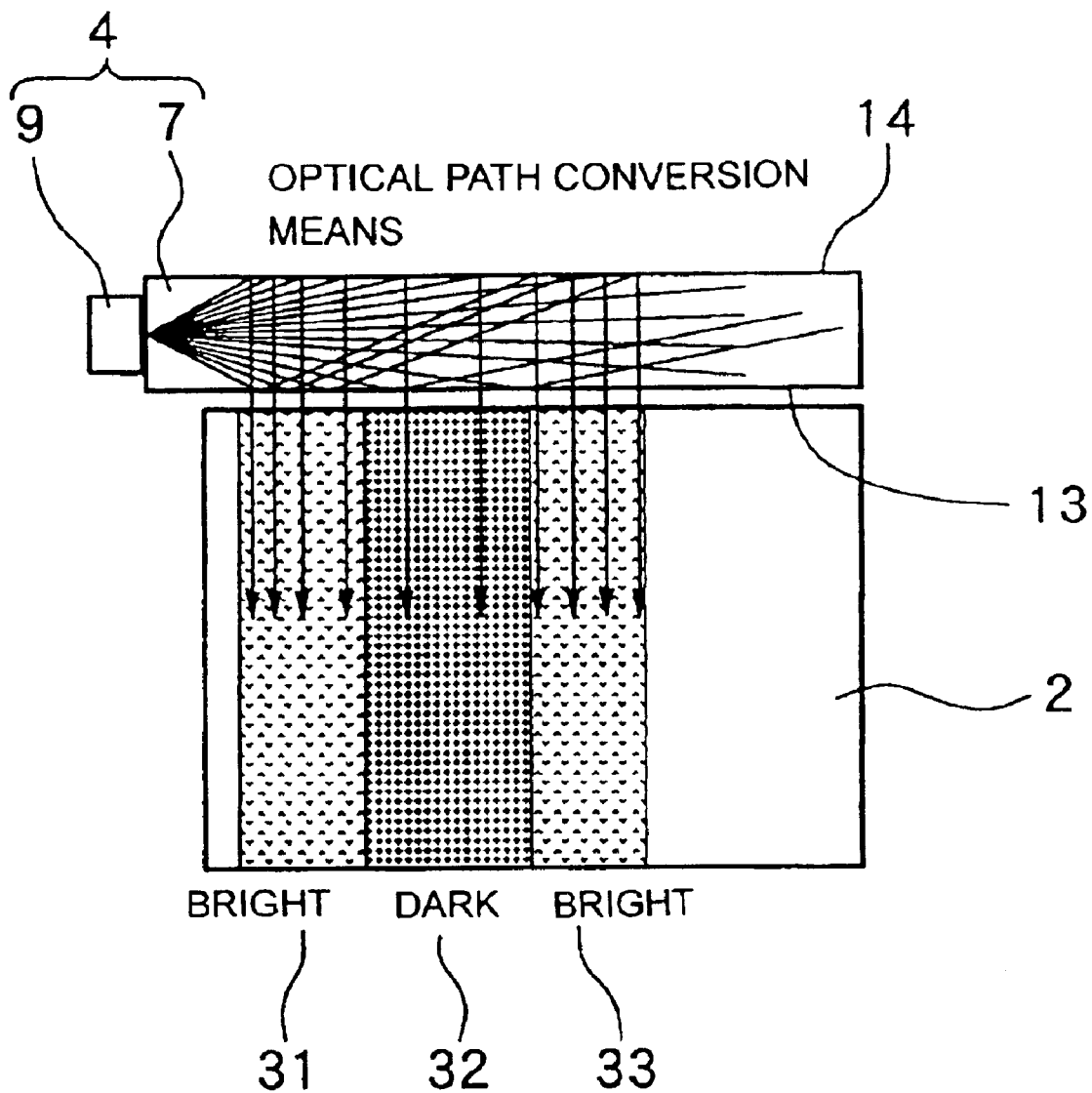
FIG. 11 is a schematic representation of light emitted from a spot-like light substrate.
Figure 12:
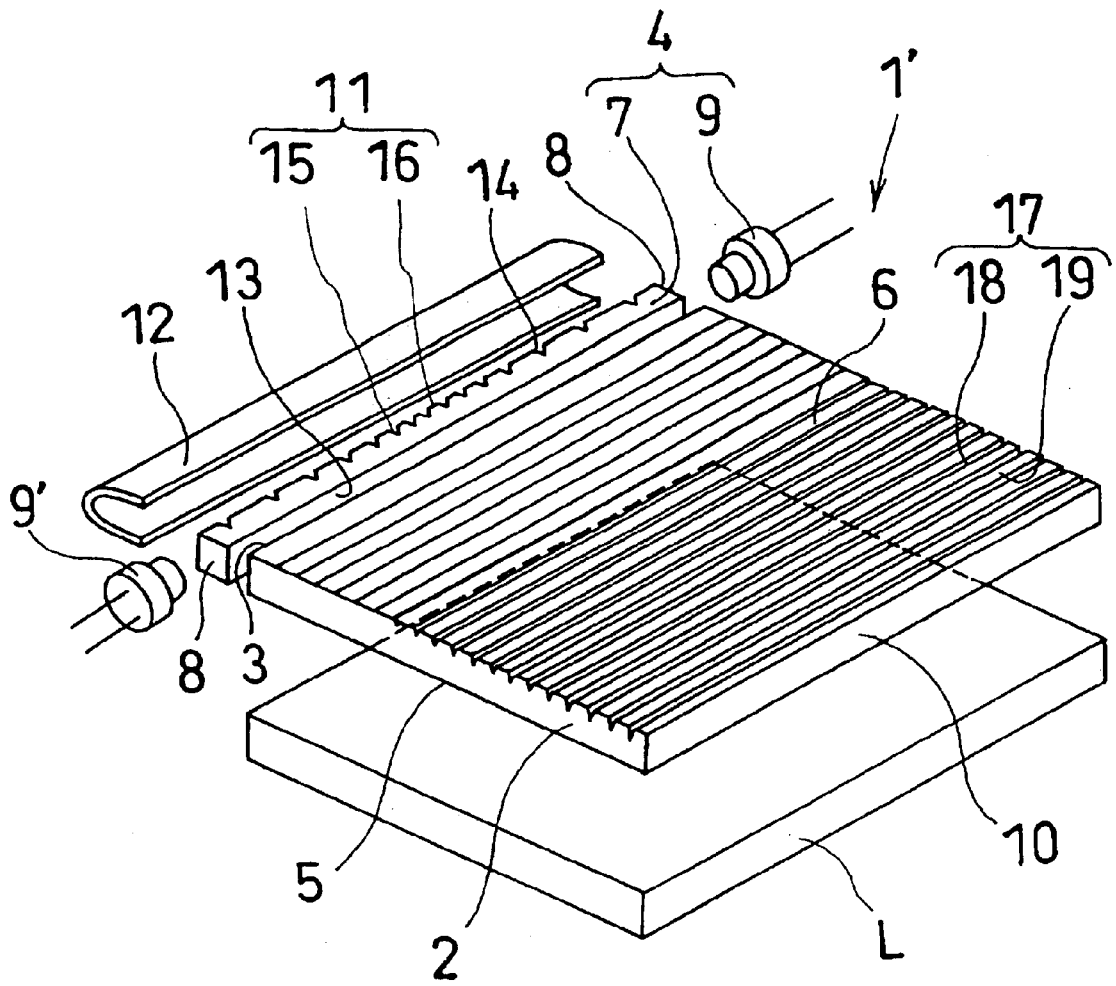
FIG. 12 is an exploded perspective view showing an embodiment of a conventional spread illuminating apparatus.

As shown in FIGS. 6 and 7, when the white coating 28a is not present (without white coating: marked with X), unevenness is generated in light intensity through the positions a to f, which shows generation of sharp change of brightness on the observation surface. The mechanism of generation of the sharp change of brightness is described with reference to FIG. 11. Light is emitted radially from the spot-like light source 9 and reflected at the faces 13 and 14 (light rays reflected at the face 14 and traveling into the transparent substrate 2 are each indicated by an arrow). Light reflected at a portion of the face 14 positioned relatively close to the spot-like light source 9 is large in amount per area (the number of the arrows (light rays) is large), thereby generating a first bright portion 31. The amount of light reflected at the face 14 decreases with the increase in distance from the spot-like light source 9. However, with further increase in the distance, the light once reflected at a portion of the face 13 positioned closer to the spot-like light source 9 is to be reflected at the face 14. This re-reflected light is added to light initially reflected at the face 14 (the number of the arrows increases), thereby generating a second bright portion 33. An area between these two bright portions 31 and 33 constitutes a dark portion 82.

On the other hand, when the white coating 28a is present (with white coating: marked with • in FIG. 6), the light intensity degrades in a substantially linear manner from the position f toward the position a (with the increase in distance from the spot-like light source 9). This means that no sharp change of brightness is generated on the observation surface. The light intensity at the positions close to the spot-like light source 9 (the positions f and e) is higher with the white layer 28a than without it, and the light intensity at the positions far therefrom (the positions c, b and a) is lower with the white coating 28a than without it, When the white coating 28a is present, the degradation of brightness with the increase in distance from the spot-like light source 9 (from the position f toward the position a) is larger than when the white coating 28a is not present. This is because, as described above, the amount of light reflected at the face 14 of the light conductive member 7 and traveling toward the transparent substrate 2 is increased by providing the white coating 28a, and the amount of light to keep traveling within the light conductive member 7 is reduced.

In FIG. 7 (the spot-like light sources are disposed on both ends of the light conductive member), when the white coating 28a is present (with white coating: marked with •), uniform brightness substantially free from sharp difference in brightness is realized on the observation surface thanks to the linear variation of light intensity shown in FIG. 6, and the brightness of the screen is substantially equal compared with when the white coating 28 is not provided.

FIGS. 8 and 9 show measurement results when the light diffusible mat coating 28b is present as the light reflection-diffusion layer 28, with FIG. 8 showing results when one spot-like light source 9(B) is disposed on an end of the light conductive member 7 and FIG. 9 showing results when two spot-like light sources 9'(A) and 9(B) are disposed on both ends of the light conductive member 7, respectively.

The variation of the light intensity generated with the light diffusible mat coating 28b not present (without white coating: marked with X) is similar to the variation generated with the white coating 28a not present (in FIGS. 6 and 7).

On the other hand, when the light diffusible mat coating 28b is present (with white coating: marked with • in FIG. 8), the light intensity degrades in a substantially linear manner from the position f toward the position a (with the increase in distance from the spot-like light source 9). This means that no sharp change of brightness is generated on the observation surface. Further, when the light diffusible mat coating 28b is present, the degradation of the brightness with the increase in distance from the spot-like light source 9 (from the position f toward the position a) is smaller than when the white coating 28a described above is present. This is because, as described above, part of light emitted from the spot-like light sources filters through the light diffusible mat coating 28b and exits out the light conductive member 7, and the amount of proceeding light increases compared with when the white coating 28a is present.

In FIG. 9 (the spot-like light sources are disposed on both ends of the light conductive member), when the light diffusible mat coating 28b is present (with white coating: marked with •), uniform brightness substantially free from sharp differences in brightness is realized on the observation surface thanks to the linear variation of light intensity shown in FIG. 8, and the brightness of the screen is substantially equal compared with when the white coating is not provided.

According to the spread illuminating apparatus in accordance with the present invention, a light reflection-diffusion layer is formed on one face of the light conductive member having the optical path conversion means, whereby the amount of reflected light from the light conductive member toward the transparent substrate is adapted to degrade in a substantially linear manner with the increase in distance from the spot-like light sources. Thanks to the linear degradation of the light amount, the amount of light emitted from the light conductive member into the transparent substrate can be substantially constant irrespective of the distance from the spot-like light sources. And uniform brightness can be ensured by means of specific configuration for the light reflection-diffusion layer. Further, the light conductive member is pre-coated with the light reflection-diffusion layer, thereby enhancing the assembling efficiency of the spread illuminating apparatus.

What is claimed is:

1. A spread illuminating apparatus comprising:
   a transparent substrate which is made of a light-transmissible material; and
   a light source which is composed of a bar-like light conductive member having, on at least one longitudinal side face thereof, an optical path conversion means comprising a large number of light scattering portions, and spot-like light sources provided on ends thereof, said light sources being disposed along and close to an end face of said transparent substrate;
   wherein a light reflection-diffusion layer is formed on said at least one longitudinal side face of said bar-like light conductive member so as to cover said optical conversion means.

2. A spread illuminating apparatus as claimed in claim 1, wherein said light reflection-diffusion layer is a white coating.

3. A spread illuminating apparatus as claimed in claim 1, wherein said light reflection-diffusion layer is a light diffusible mat coating.

4. A spread illuminating apparatus as claimed in claim 3, wherein said light diffusible mat coating is of a frosted mat.

5. A spread illuminating apparatus as claimed in claim 3, wherein said light diffusible mat coating is of silica.

6. A spread illuminating apparatus as claimed in claim 1, wherein said light reflection-diffusion layer is formed entirely on said at least one longitudinal side face.

7. A spread illuminating apparatus as claimed in claim 1, wherein said light reflection-diffusion layer is formed partly on said at least one longitudinal side face at predetermined portions.

8. A spread illuminating apparatus as claimed in claim 4, wherein said light diffusible mat coating is present entirely on said at least one longitudinal side face.

9. A spread illuminating apparatus as claimed in claim 4, wherein said light diffusible mat coating is present partly on said at least one longitudinal side face at predetermined portions.

10. A spread illuminating apparatus as claimed in claim 2, wherein said light reflection-diffusion layer is formed entirely on said at least one longitudinal side face.

11. A spread illuminating apparatus as claimed in claim 3, wherein said light reflection-diffusion layer is formed entirely on said at least one longitudinal side face.

12. A spread illuminating apparatus as claimed in claim 2, wherein said light reflection-diffusion layer is formed partly on said at least one longitudinal side face at predetermined portions.

13. A spread illuminating apparatus as claimed in claim 3, wherein said light reflection-diffusion layer is formed partly on said at least one longitudinal side face at predetermined portions.

14. A spread illuminating apparatus as claimed in claim 5, wherein said light diffusible mat coating is present entirely on said at least one longitudinal side face.

15. A spread illuminating apparatus as claimed in claim 5, wherein said light diffusible mat coating is present partly on said at least one longitudinal side face at predetermined portions.

* * * * *